(No Model.)

L. GOHLKE.
JOINT FASTENER.

No. 576,572. Patented Feb. 9, 1897.

Witnesses:
Fred Gerlach
A. Adamuck.

Inventor.
Louis Gohlke
By Peirce & Fisher
Attorneys.

UNITED STATES PATENT OFFICE.

LOUIS GOHLKE, OF GRAND RAPIDS, MICHIGAN, ASSIGNOR OF ONE-HALF TO FREDERICK H. MARX, OF CHICAGO, ILLINOIS.

JOINT-FASTENER.

SPECIFICATION forming part of Letters Patent No. 576,572, dated February 9, 1897.

Application filed March 7, 1896. Serial No. 582,214. (No model.)

*To all whom it may concern:*

Be it known that I, LOUIS GOHLKE, a citizen of the United States, and a resident of Grand Rapids, in the county of Kent and State of Michigan, have invented certain new and useful Improvements in Joint-Fasteners, of which I do declare the following to be a full, clear, and exact description, reference being had to the accompanying drawings, forming a part of this specification.

The present invention has for its object to provide improved means whereby two parts that are to be united together may be securely joined and fastened; and this object of invention I have accomplished by the novel features of invention hereinafter described, illustrated in the accompanying drawings, and particularly pointed out in the claim at the end of this specification.

Figure 1:
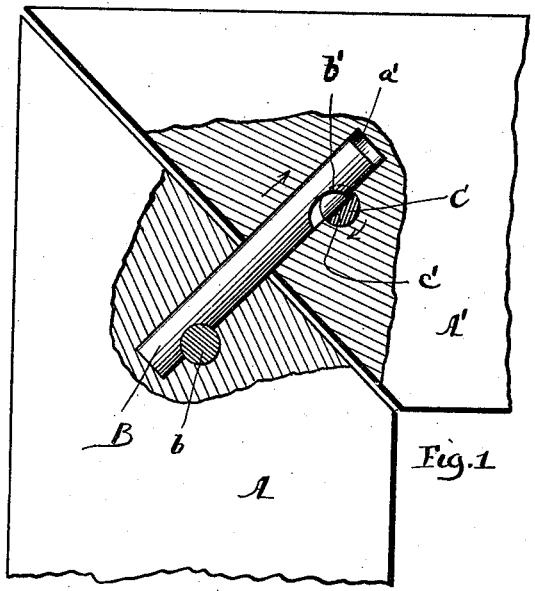
Figure 2:
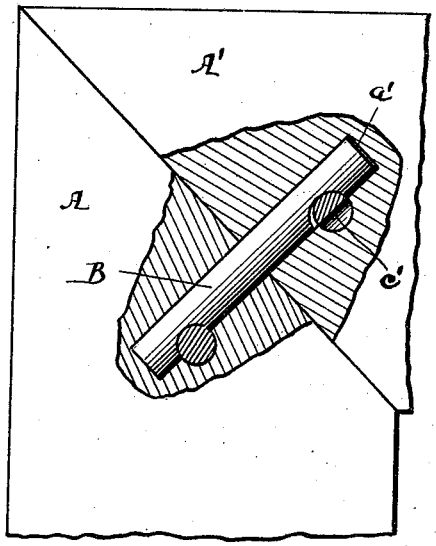
Figure 3:
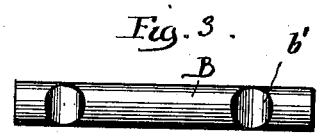
Figure 4:
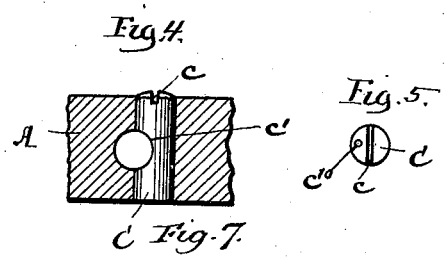
Figure 5:
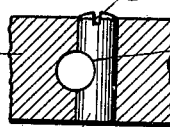
Figure 6:
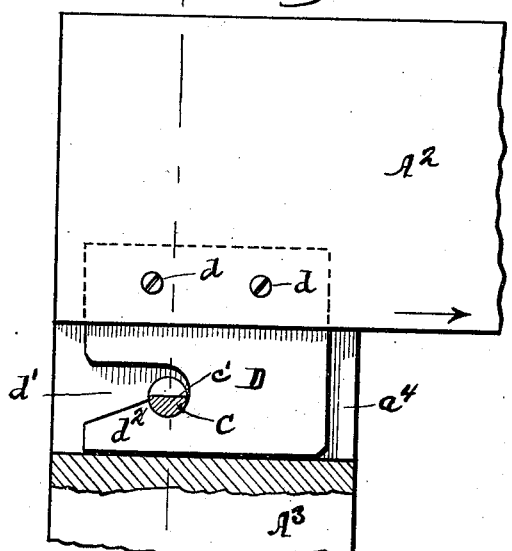
Figure 7:
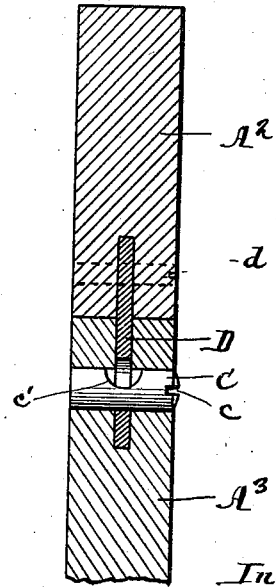

Figure 1 is a plan view showing two parts connected by a miter-joint and having my invention applied thereto. Fig. 2 is a view similar to Fig. 1, but showing the parts drawn tightly together. Fig. 3 is a detail view of the bolt. Fig. 4 is a sectional view through one of the parts adjacent the locking key or pin, which latter is shown in elevation. Fig. 5 is an end view of the key or pin. Fig. 6 is a plan view, a part being broken away, showing a modified form of the invention. Fig. 7 is a view in vertical section on line 7 7 of Fig. 6.

A designates one of the parts to be joined together, and A' denotes the other of said parts, these parts being shown as united by a miter-joint. In the part A is securely embedded one end of a bolt or projection B, this bolt or projection being of any desired shape (such as round, square, or flat) and being held in place by a transverse pin $b$ or in any other convenient manner. The bolt or projection B extends to a distance beyond the edge of the part A and is adapted to enter a recess $a'$, formed in the part A'. Adjacent this recess $a'$ is located an eccentric pin or key C, that will engage with a shoulder $b'$, formed upon one side of the bolt B. The pin or key C passes transversely through the part A', and its outer end is shown as provided with a notch $c$ to receive a screw-driver, whereby the pin or key C can be readily turned, although manifestly any other means for turning the key may be used. The desired eccentricity can be given to the pin or key C in various ways, but I prefer to effect this by simply cutting out a portion of the pin or key C adjacent its center, so that when said pin or key C is in one position, as shown in Fig. 1, the bolt B will slip past the pin or key C and in such position that the shoulder $b'$ of the bolt will be engaged by the pin or key C as the latter is turned in the direction of the arrow, Fig. 1. When the pin C is thus turned, as shown in Fig. 1, until the shoulder $c'$ of its eccentric part contacts with the shoulder $b'$ of the bolt B, the bolt B will be turned in the direction of the arrow, Fig. 1, thereby causing the part A to be brought tightly against the part A' when the key C has been turned to the position seen in Fig. 2 of the drawings. By this means the parts A and A' will be drawn firmly together and will be tightly locked in such position. Moreover, the bolt B, being embedded in the part A and entering a seat in the part A', will give great strength to the parts A and B about their point of union. If desired, an eccentric pin or key like the pin or key C might be employed instead of the fixed pin $b$, but I do not consider this as necessary.

My improved joint-fastener will be found of great advantage in a large variety of work, such, for example, as in making the joints of furniture, such as desks, chairs, counters, tables, wardrobes, and the like, and, indeed, in a great variety of other situations where it is desired to firmly join two parts together.

The joint that is effected by my invention will be found so tight and firm that for a great variety of work the abutting edges of the parts that are united need not be glued together, although my invention will be of great advantage when the parts are united by glue, because the parts will be firmly held during the time that the glue is setting, and the necessity of employing clamps or like devices for retaining the parts together during the setting of the glue is altogether avoided.

It is manifest that the broad feature of my invention can be applied to a great variety of uses, and that the details of construction can be very widely modified without departing from the scope of the invention. Thus, for example, in Figs. 6 and 7 of the drawings I have illustrated a simple form of joint-fastener that will be found very effective, particularly in the class of work known as "knockdown" work, that is to say, work in which the parts are temporarily set up with a view to being afterward taken apart for storage or shipment. Referring to the construction illustrated in Figs. 6 and 7, it will be seen that the parts $A^2$ and $A^3$ are united together by a butt-joint. The part $A^2$ has embedded therein a plate or projection D, that is held in place by screws or pins $d$, and the outer portion of this projection D is formed with an open slot $d'$, having a shoulder $d^2$. The part $A^3$ is formed with a recess $a^4$, adapted to receive the projection or plate D, and through the part $A^4$ extends the eccentric-pin C. This pin C is similar to the pin C hereinbefore described, and its mode of operation is the same. When the parts $A^2$ and $A^3$ are to be joined together, the pin C will be turned to the position opposite that shown in Fig. 6 of the drawings, so as to permit the part $A^2$ to be moved in the direction of the arrow from out the slot $a^4$. This form of my invention will be found particularly advantageous where parts are to be connected together in such manner that they can be readily taken apart again, as, for example, in connecting legs to knockdown tables or the like. The plate or projection D, being embedded in the part $A^2$ and entering the recess $a^4$ of the part $A^3$, not only serves, in connection with the pin C, to securely lock the parts together, but also affords an exceedingly strong and effective joint. In Fig. 5 of the drawings the head of the key or pin C is shown as formed with a notch or sunken part $c^{10}$, the purpose of this being merely to indicate the position of the key, that is to say, whether in or out of engagement with the bolt B or D.

Having thus described my invention, what I claim as new, and desire to secure by Letters Patent, is—

The combination with two parts to be joined together, said parts having opposing faces, of a projection or bolt embedded in one of said parts and provided with a shoulder, and a pivotally-sustained eccentric pin or key embedded in said other part at a distance from its opposing face corresponding to the distance of the shoulder of said bolt from the opposing face of the other of said parts, whereby when said parts are placed together the turning of the eccentric-key will serve to draw the opposing faces of the parts firmly together, substantially as described.

LOUIS GOHLKE.

Witnesses:
FRED GERLACH,
FREDERICK H. MARX.